United States Patent [19]
Bricaud et al.

[11] Patent Number: 6,130,387
[45] Date of Patent: Oct. 10, 2000

[54] CARD DETECTING SWITCH

[75] Inventors: Herve Guy Bricaud; Yves Pizard, both of Dole, France

[73] Assignee: ITT Manufacturing Enterprises, Inc., Wilmington, Del.

[21] Appl. No.: 09/207,389

[22] Filed: Dec. 8, 1998

[30] Foreign Application Priority Data

Dec. 26, 1997 [FR] France ................................ 97 16566

[51] Int. Cl.⁷ .................................................. H01H 27/00
[52] U.S. Cl. ...................................... 200/43.04; 439/188
[58] Field of Search ................................ 200/43.04, 283, 200/284, 51.09, 51.1, 51.11, 46; 439/188

[56] References Cited

U.S. PATENT DOCUMENTS

| 5,330,363 | 7/1994 | Gardner et al. | 439/188 |
| 5,775,937 | 7/1998 | Bricaud et al. | 439/489 |
| 5,807,124 | 9/1998 | Bricaud et al. | 439/188 |

FOREIGN PATENT DOCUMENTS

| 0 474 519 B1 | 6/1991 | European Pat. Off. . |
| 0 587 497 A1 | 9/1993 | European Pat. Off. . |
| 9001842 | 2/1990 | France . |
| 2 737 321 | 7/1995 | France . |
| WO 95/33245 | 5/1995 | WIPO . |

*Primary Examiner*—Michael L. Gellner
*Assistant Examiner*—Nhung Nguyen
*Attorney, Agent, or Firm*—Thomas L. Peterson

[57] ABSTRACT

A switch (12, in FIG. 1) for mounting on a circuit board (P), has a minimum number of parts and a very small height. The switch includes an insulative support (29) for lying on the circuit board and a switch element (33) with a pedal (58) extending above the upper face (18) of the support to be downwardly deflected by a card as the card reaches its fully installed position. The switch element is formed of electrically conductive sheet metal material, with a connect tab (43) for permanently engaging a first switch trace (25) on the circuit board, and with a contacting part (44) for lying over a second trace (26) on the circuit board. When the pedal is depressed, it also depresses the contacting part (44) to press it against the second trace to thereby close the switch.

14 Claims, 19 Drawing Sheets

CARD DETECTING SWITCH

BACKGROUND OF THE INVENTION

The present invention relates to an electrical switch assembly that can be built into a connector that connects to pads of a smart card, the present switch assembly detecting the presence of a smart card in its fully inserted position. The object of the invention is to provide a switch of small height and with a minimum number of parts.

SUMMARY OF THE INVENTION

In accordance with one embodiment of the present invention, a switch assembly is provided for detecting a card as it approaches its fully installed position in a read/write device, where the switch assembly has a minimum number of parts and has a minimum thickness. The switch assembly includes a support of insulative material for lying on a circuit board, and a switch element of electrically conductive material and preferably of sheet metal. The switch element has a heel fixed to the support, a connection tab for engaging a trace on the circuit board, a pedal that extends above the upper support of the face to be depressed by a card, and a contacting part that is coupled to the pedal to be downwardly depressed when the pedal is depressed. The contacting part lies over a second trace on the circuit board, to directly engage the second trace when the pedal is depressed.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
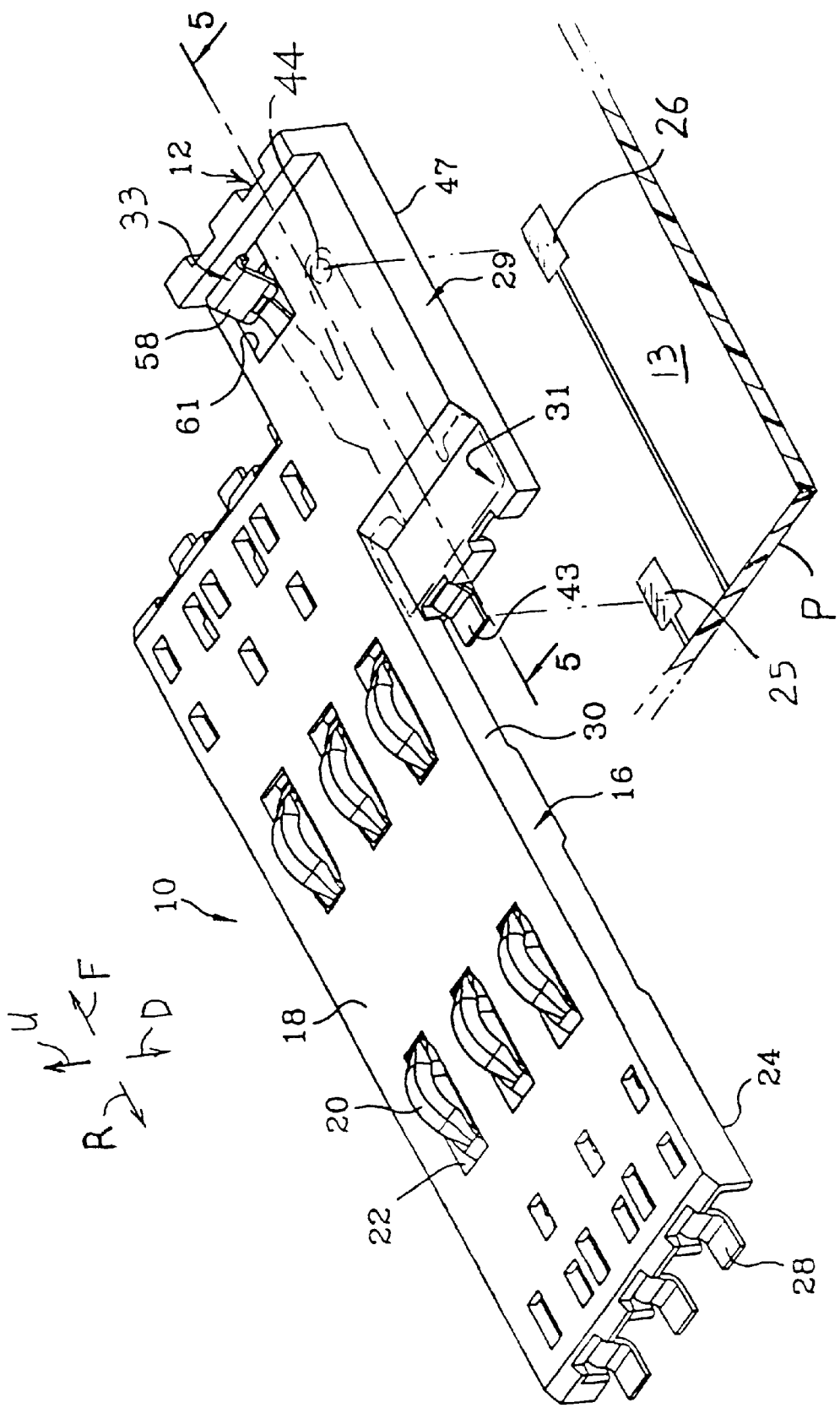
FIG. 1 is an exploded top and rear isometric view of an electrical connector with a switch assembly of the present invention, and a portion of a circuit board on which the connector can lie.

FIG. 1 illustrates a complete connector 10 having a built-in switch assembly 12 for detecting a smart card as it approaches a fully inserted position on the connector. The connector is designed to be mounted on a circuit board P of a read/write apparatus which includes guides for guiding the card during its insertion into the apparatus. The connector includes a frame 16 of molded plastic insulating material with opposite sides 30, which includes a frame extension or support 29 for the switch assembly 12. The connector has a flat upper face 18 and has a plurality of contacts with contact blades 20 that project through slots 22 to engage contact pads on a smart card. The contacts have connecting tabs 28 for engaging corresponding traces on the upper face 13 of the circuit board, as by soldering thereto in a surface-mount arrangement. The frame has a lower face 24 that lies on the circuit board.

The extension 29 of the frame 16, serves as the housing or support for the switch assembly 12 that detects the presence of the card when it is nearly fully inserted in a forward direction F. The extension 29 is preferably molded integrally with the rest of the frame 16. It is noted that the extension has a downstep at 31 so that the card can have embossings that can be received over the step. The upper face 18 extends along the extension, and can support the upper face of a card, or at least lies close to an inserted card.

The switch assembly 12 includes a switch element 33 which is cut and bent from a sheet of electrically conductive material, preferably sheet metal. The switch element includes a pedal 58 that extends at an upward incline through a hole 61 in the frame extension or support 29, a connect tab 43, and a contacting part 44. The circuit board upper face 13 has first and second switch traces 25, 26. When the connector lies on the circuit board, the connector tab 43 lies on the first trace 25 and is permanently connected thereto, as by soldering it thereto. The contacting part 44 of the switch element lies over the second switch trace 26, but initially is spaced above the second trace. However, when the pedal 58 is depressed, it causes depression of the contacting part 44 against the second switch trace 26. This results in the closing of the switch, in that the first and second traces 25, 26 are connected together through the switch element 33 by engaging the connect tab 43 and contacting part 44 of the switch element.

Figure 2:
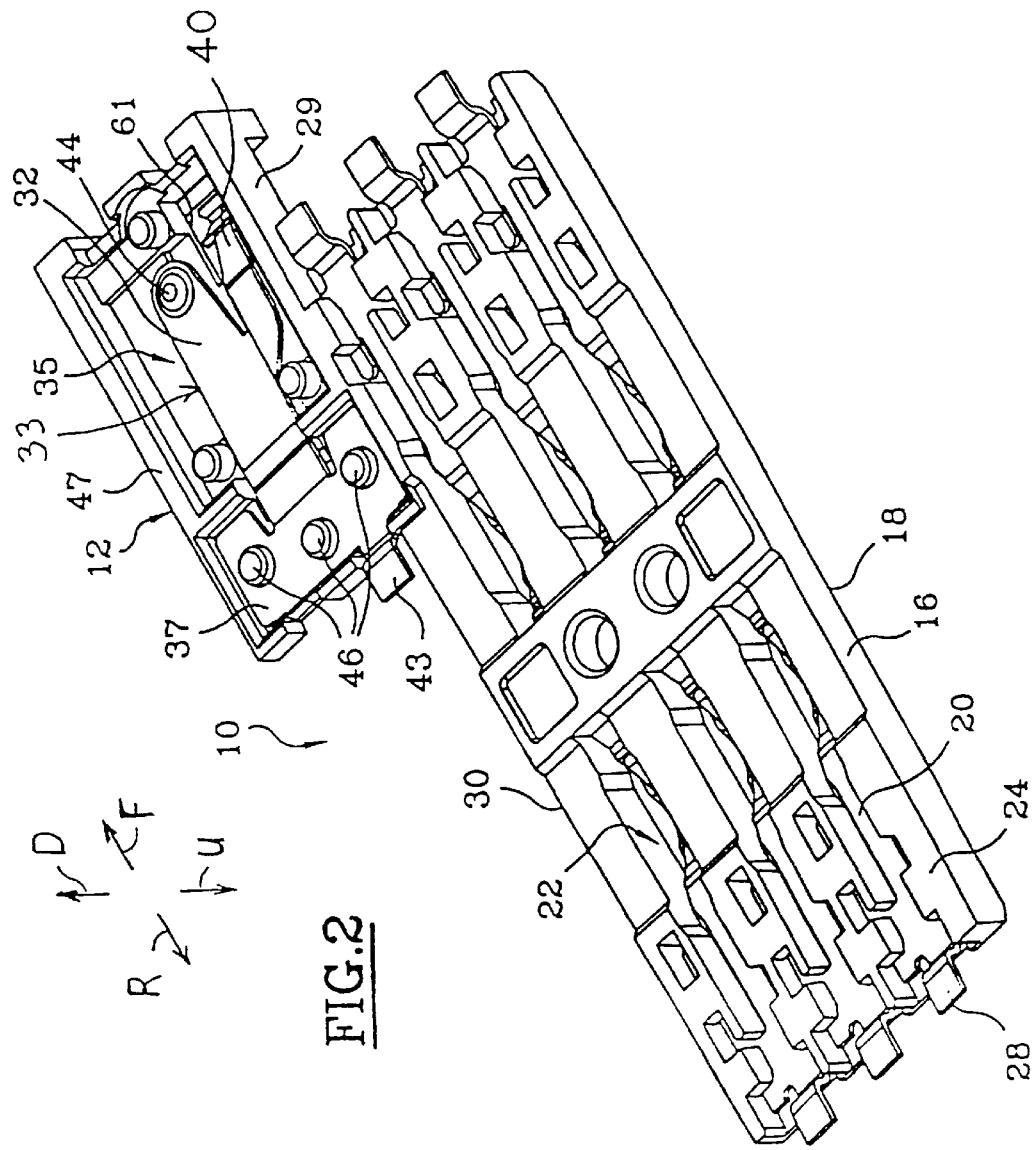
FIG. 2 is an upside-down bottom and rear isometric view of the connector of FIG. 1.
Figure 3:
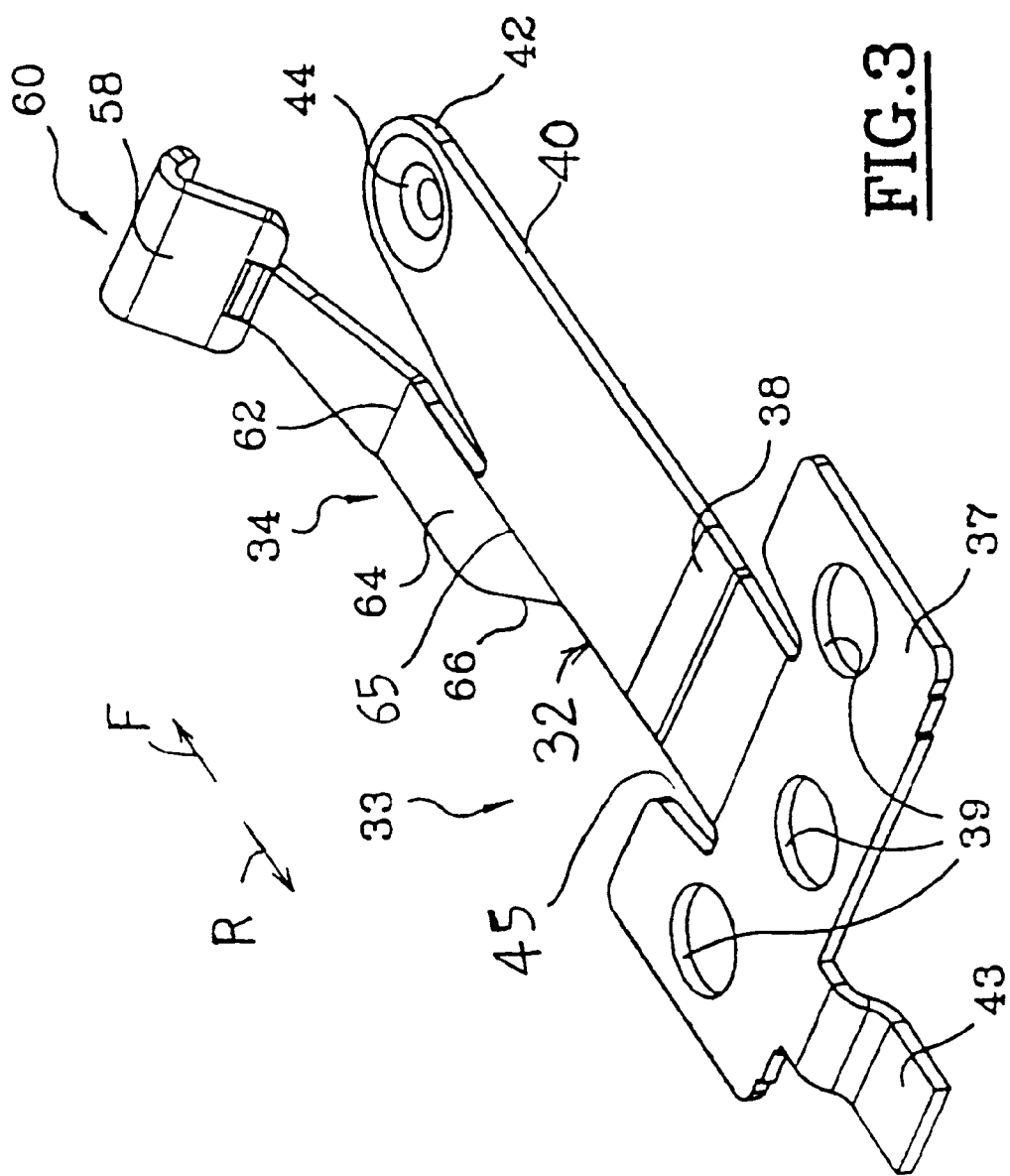
FIG. 3 is a top and rear isometric view of the switch element of the assembly of FIGS. 1 and 2.
Figure 4:
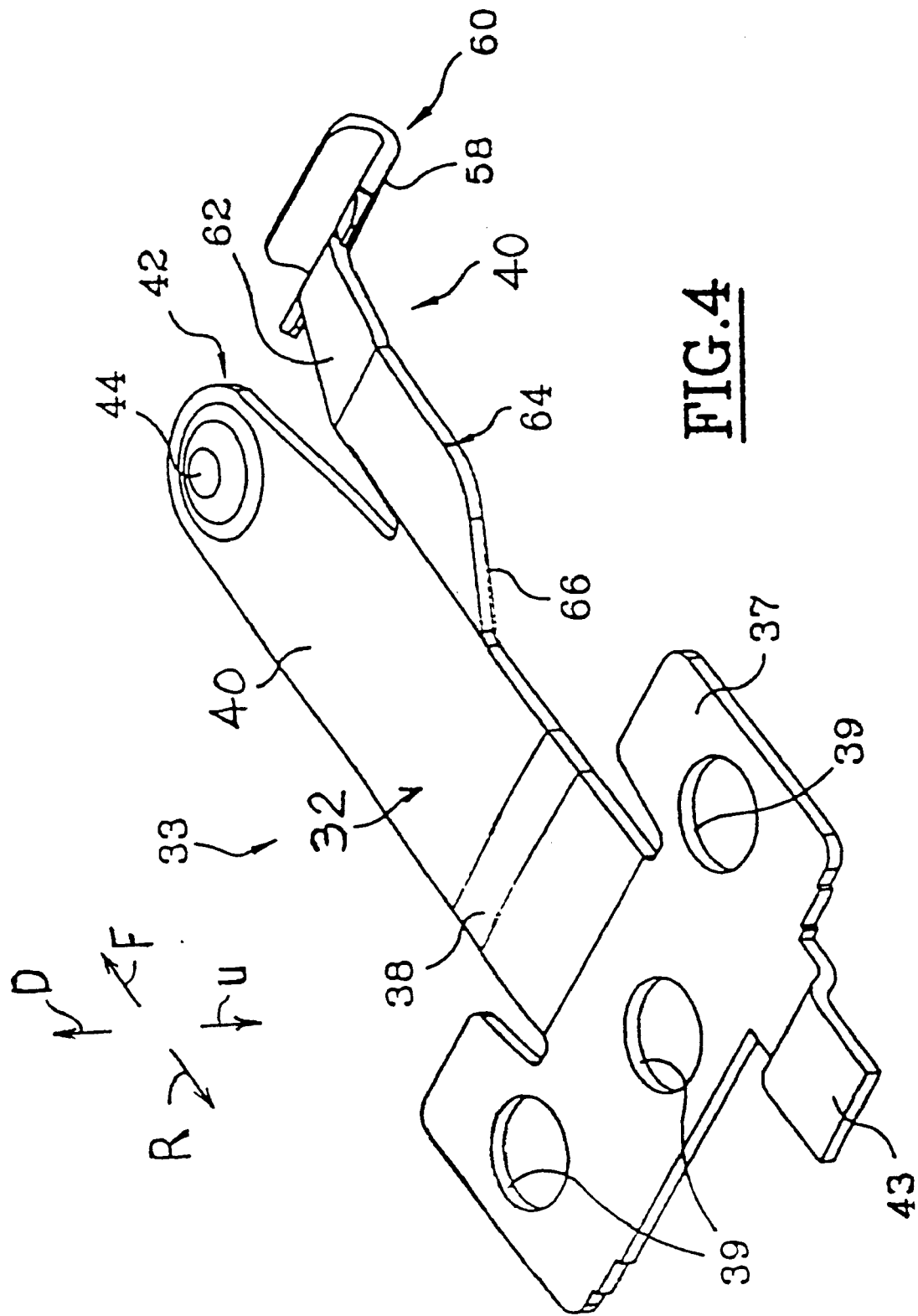
FIG. 4 is an upside-down bottom and rear isometric view of the switch element of FIG. 3.

FIG. 3 illustrates details of the switch element 33 which includes the pedal 58, the connect tab 43, and the contacting part 44. The switch element includes a heel 37 at its rear end, for mounting the switch element on the molded insulative support. Such mounting is accomplished by projecting three studs 46 (FIG. 2) through holes 39 in the heel 37 and upsetting the lower ends of the studs. The heel 37 and the rest of the switch element 33 lies in a downwardly-opening cavity 35 in the insulative support. The connection tab 43 (FIG. 3) extends largely rearwardly from the heel. A deflectable portion 32 of the switch element extends primarily forward from the fixed heel 37. The deflectable portion 32 includes a blade portion 40 and a lever 64 that merges with and extends from a middle part 65 of the deflectable portion, and an elbow 66 that connects to the lever 64. A bend 62 along the lever ends in a front free end 60 that includes the pedal 58. When the pedal 58 is depressed, it applies a downward force to the middle part 65 of the deflectable portion 32, resulting in downward depression of the blade portion 40 and of a second end 42 of the control blade portion which includes the contacting part 44. The contacting part has a convex lower surface for engaging the second switch trace on the circuit board. The heel 37 is provided with slots 45 that extend the deflectable portion 32 to increase its flexibility.

Figure 5:
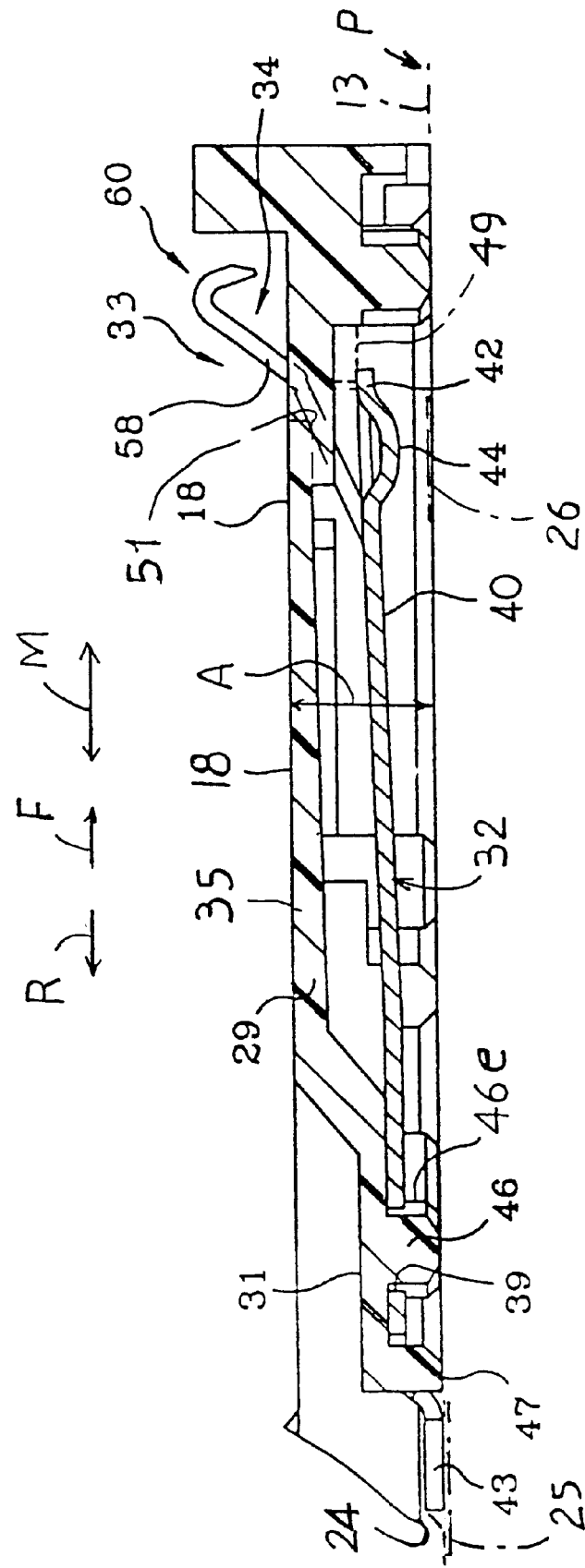
FIG. 5 is a sectional view taken on line 5—5 of FIG. 1, with the switch in its open position.

FIG. 5 shows that the deflectable portion 32 of the switch element, including the blade portion 40, which extends forwardly from the heel 37, lies within a few degrees (3 degrees) of a horizontal plane that is parallel to the upper surface 13 of the circuit board P and the upper surface 18 of the support One way to control the height of the contacting part 44 above the circuit board face 13 and the second switch trace 26 thereon, is by having the second end 42 of the control blade abut a stop 49. Another way is for the pedal 58 to abut a corner 5i of the opening through which it projects above the upper face 18 of the support. With the lower face 47 of the support bearing against the circuit board, the upset lower end 46e of the studs 46 lie about even with the lower face 47.

The arrangement of FIG. 5 results in a switch assembly 12 with minimal parts, there being only the support or frame extension 29 and the switch element 33, with a pair of switch traces provided on the circuit board. The fact that the blade portion 40 of the switch element extends in substantially a horizontal plane that is parallel to the heel 47 that lies closely above the circuit board, with no snap dome or the like required under the switching element, results in a switch assembly of very low height.

Figure 6:
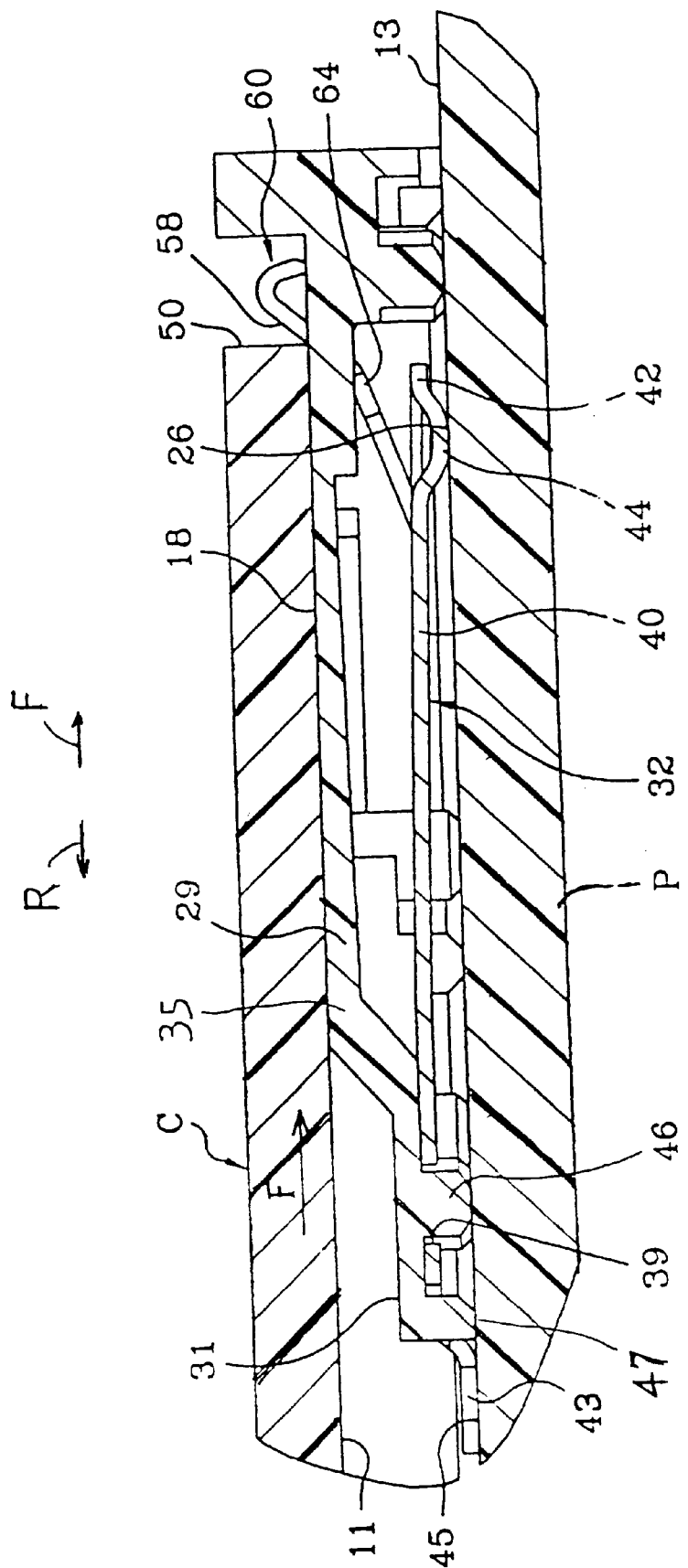
FIG. 6 is a view similar to that of FIG. 5, showing a smart card approaching its full insertion position, with the switch in the closed position.

FIG. 6 shows the front or leading edge 50 of a card C as it is advanced in the forward direction F toward its full insertion position, with the pedal 58 being partially depressed. Such depression is sufficient for the contacting part 44 of the switch element to engage the second switch trace 26 and close the switch.

Figure 7:
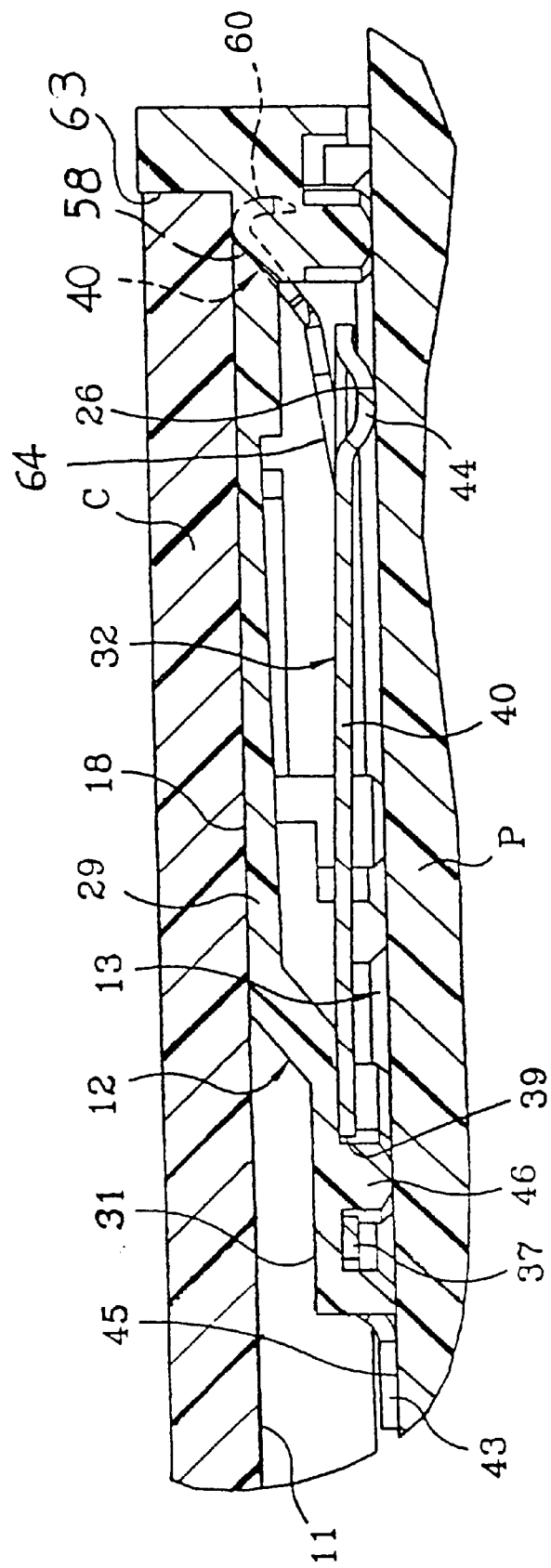
FIG. 7 is a view similar to that of FIG. 6, with the card fully inserted.

FIG. 7 shows the card C in its fully inserted position wherein it abuts a stop surface 61. The free front end 60 of the switch element with the pedal 58 thereof, has been downwardly deflected so it is even with the top wall 18 of the support. This merely results in the contacting part 44 pressing more forcefully against the second switch trace 26 on the circuit board. The lever 64 of the switch element bends but the contact part 44 does not move down any further. The ability of the pedal 58 to overtravel downward considerably beyond the amount required to initially close the switch, enables the switch assembly to be constructed with greater assurance that the switch will be closed every time the pedal 58 is depressed by a card. The resilience of the deflectable portion 32 allows the pedal 58 to be depressed without requiring a large force to depress it, which minimizes wear of the front edge of the card. Minimizing wear at the front edge is desirable, because the front edge is repeatedly subject to wear every time it is inserted into a read/write device.

Figure 8:
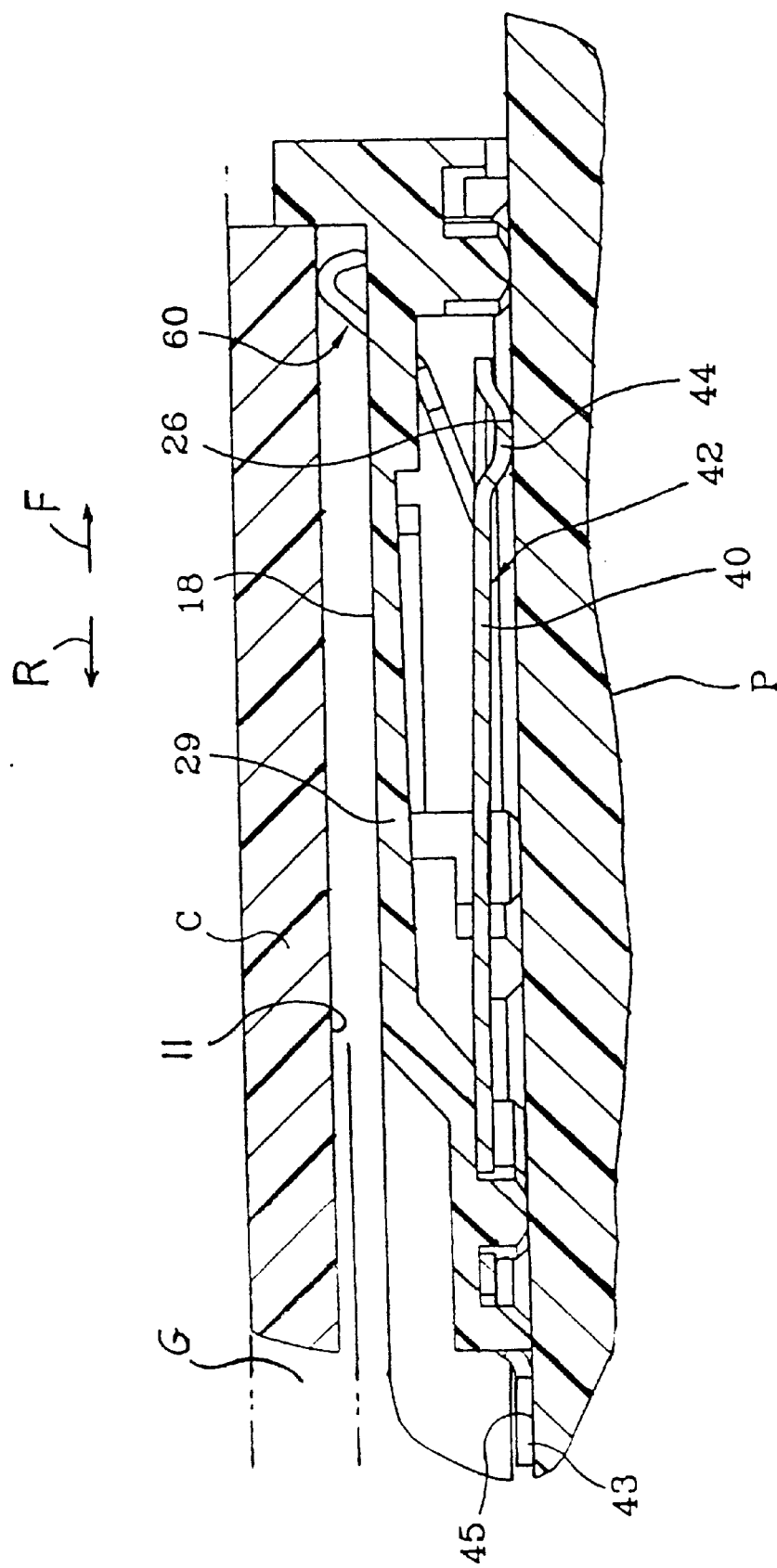
FIG. 8 is a view similar to that of FIG. 7, with the card in its full forward position but in a maximum raised position which still results in closing of the switch.
Figure 9:
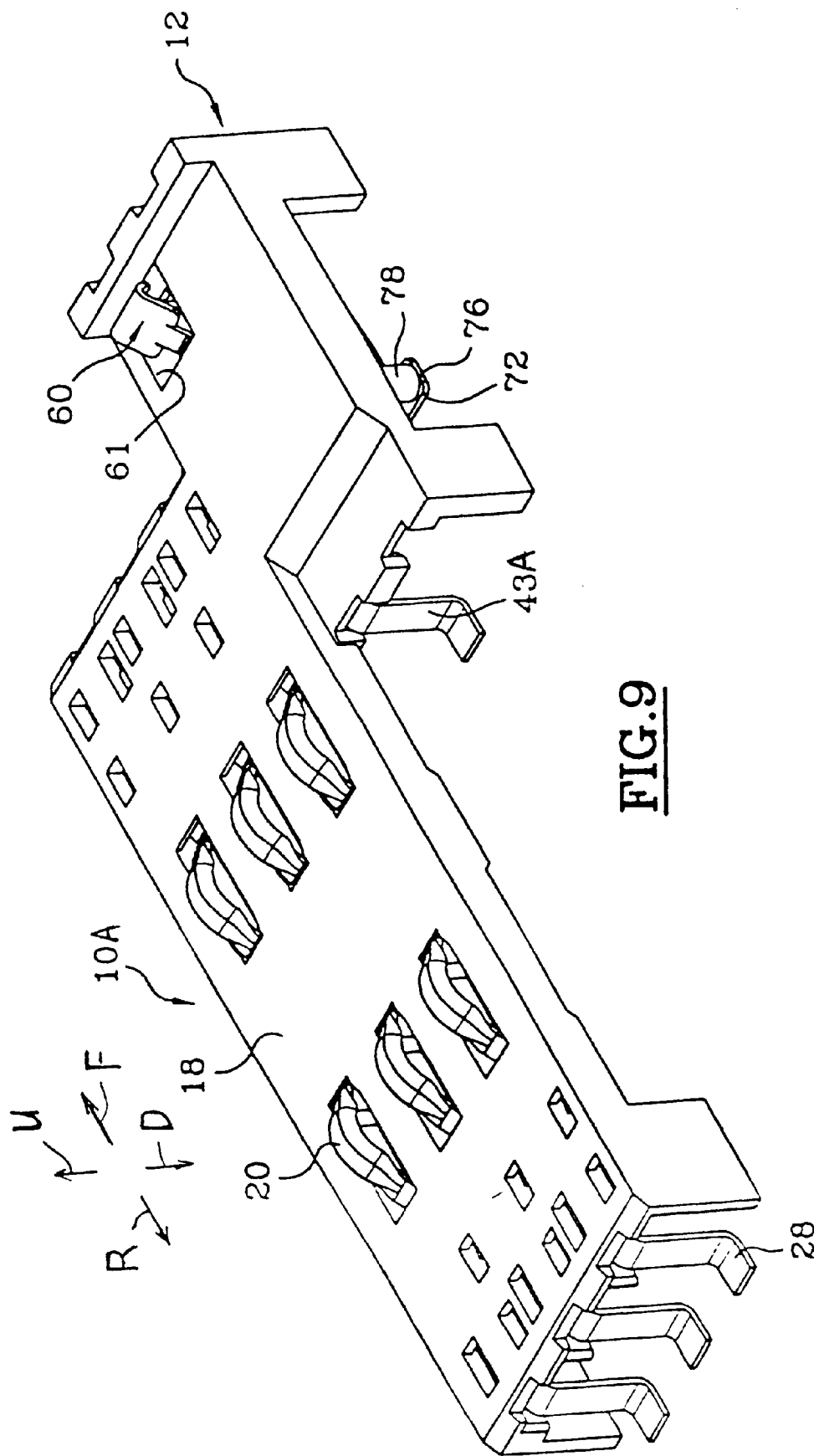
FIGS. 9–16 are views similar to those of FIGS. 1–8, respectively, but illustrating a second embodiment of the invention wherein the connector, including the switch assembly, is constructed to lie at a higher level above the circuit board.
Figure 10:
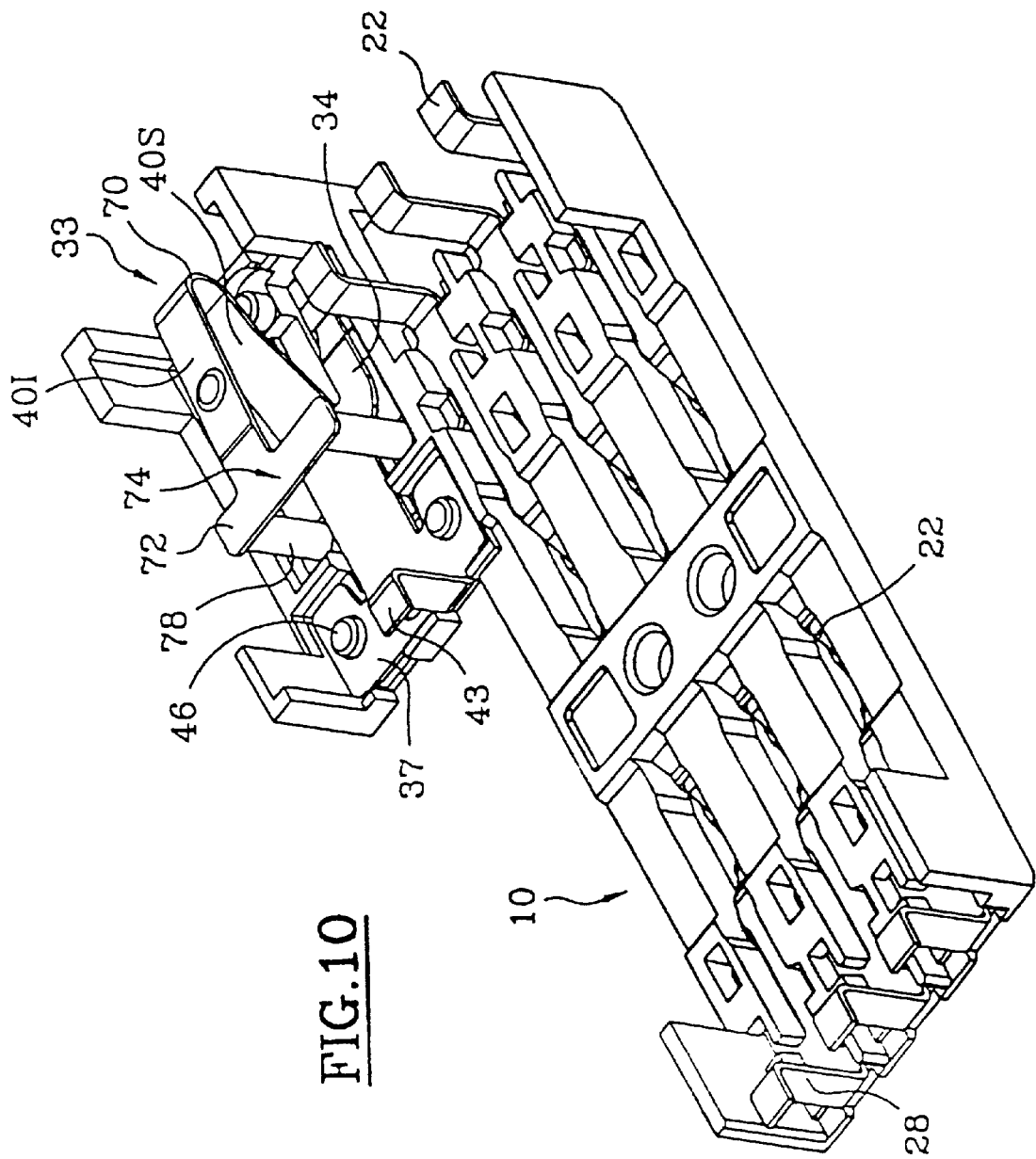

FIG. 8 illustrates the card, that is guided by guides that engage opposite side edges of the card as it moves against a stop surface 63, with lower face 11 of the card spaced above the switch support top surface at 18. For a moderate distance of the card above the surface 18, the card will still deflect the front free end 60 of the switch device sufficiently to move the contacting part 44 against the second switch terminal 26 on the circuit board to close the switch. Such moderate distance is about half the card thickness, or about 0.5 mm. This reduces the tolerances required between the height of the circuit board and switch assembly 12, and the height of the top of the card guide slots G.

The switch assembly shown in FIG. 5 has its upper face 18 lying a small distance A above the circuit board upper face 13, of about 1 mm. The contacting part 44 lies about 0.25 mm above the circuit board and the trace 26 thereon. The free front end 60 of the switch element, with the pedal 58, can deflect downward by about 0.75 mm before it reaches the level of the upper face 18. A downward deflection of about half that much, or about 0.4 mm in the position of FIG. 6, assures that the switch will close. The switch will not be closed when a downward deflection of the pedal 50 of less than about 0.2 mm occurs. The switch has a minimum number of parts because there is only one moving part, that being the one-piece switch element 33. This results in only one part that must be fixed to the support, this being the heel 37 of the switch element. The result is a minimum tooling, manufacturing, and assembly cost. The very small thickness of the switch, and the fact that it occupies a very small area over the circuit board, makes it possible for the switch assembly, particularly the switch element and the portions of the frame 18 on which the switch element is mounted, to be provided in a variety of switches of different thicknesses. The location where temporary contact is made, which occurs between the contacting part 44 of the switch element and the second switch trace 26 on the circuit board, is not directly open to an area above the switch, since the hole 61 (FIG. 1) in the extension, does not lie directly over the contacting part 44. However, the temporary contacting surfaces are not as well protected as in prior art switch assemblies that include a snap dome lying within a sealed cavity portion. It is noted that the contacting part 44 and second circuit board trace 26 are easily gold-plated for reliable contact.

Figure 11:
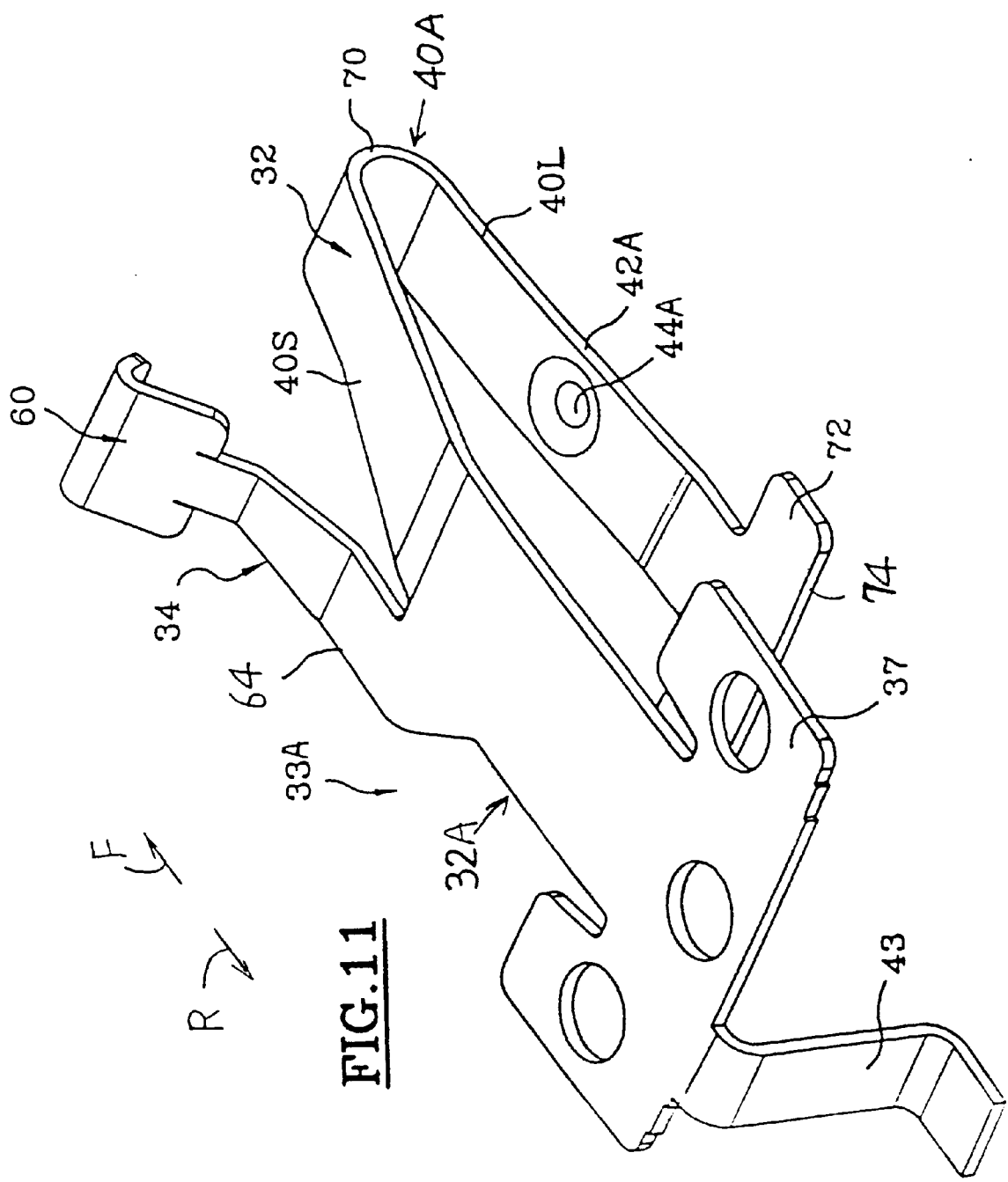
Figure 12:
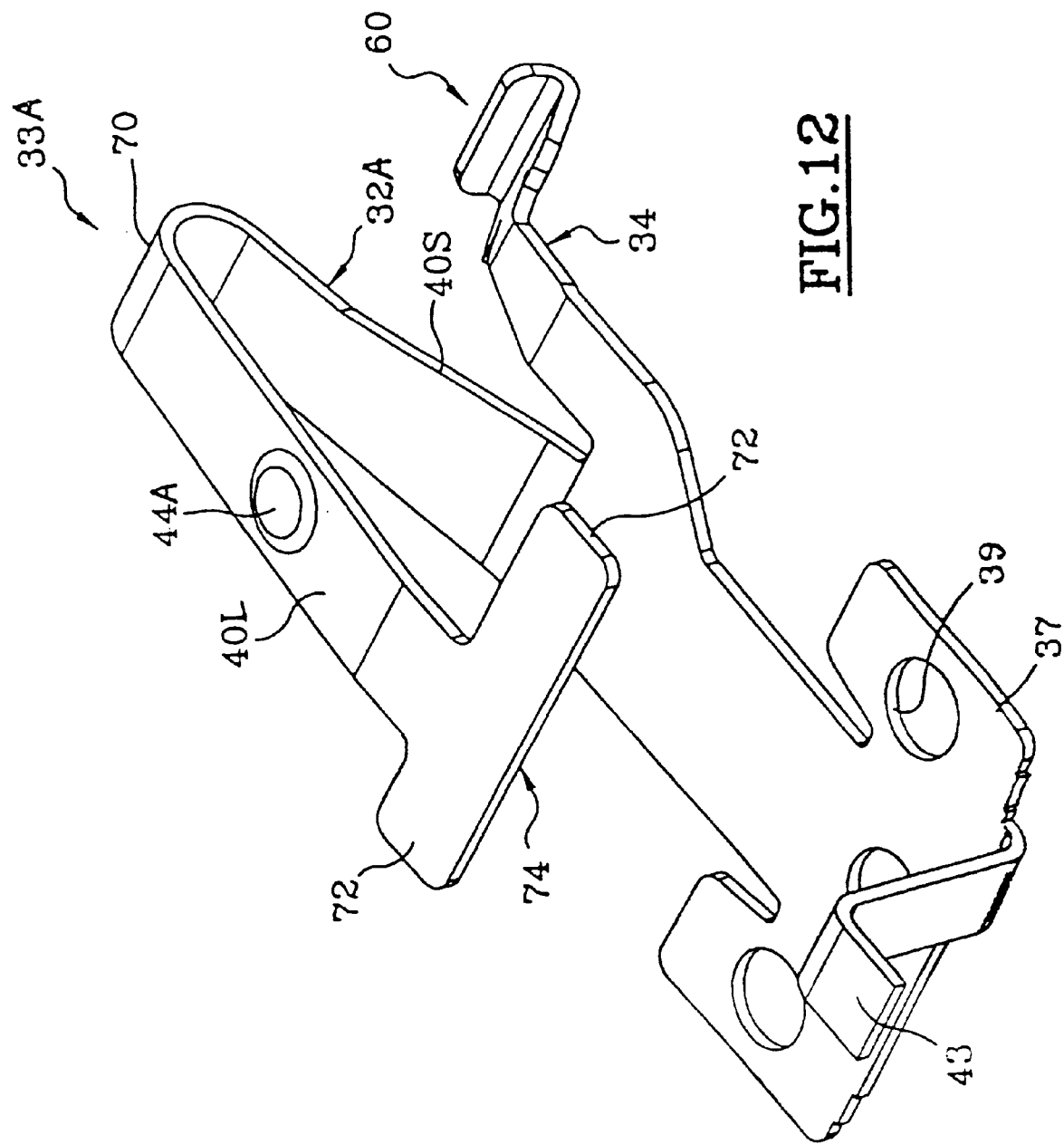

FIGS. 9–16 illustrate a connector 10A of another embodiment of the invention, where the front free end 60 of the switching element must lie considerably higher above the circuit board, than in the embodiment of FIGS. 1–8. FIG. 11 shows that the switch element 33A has a heel 37 and lever 64 that are similar to that of FIG. 3. However, the deflectable portion 32A includes a blade portion 40A with an upper branch 40S that extends at a downward-forward incline, a bend 70 of almost 180°, and a lower branch 40L that extends rearwardly from the bend. This construction results in the contacting part 44A lying a distance below the heel 37 where the switch element is fixed to the support. The switch element has a bearing bar 74 with tabs 72 to fix the height of the second end 42A of the switch element, where the contacting part 44A is located.

Figure 13:
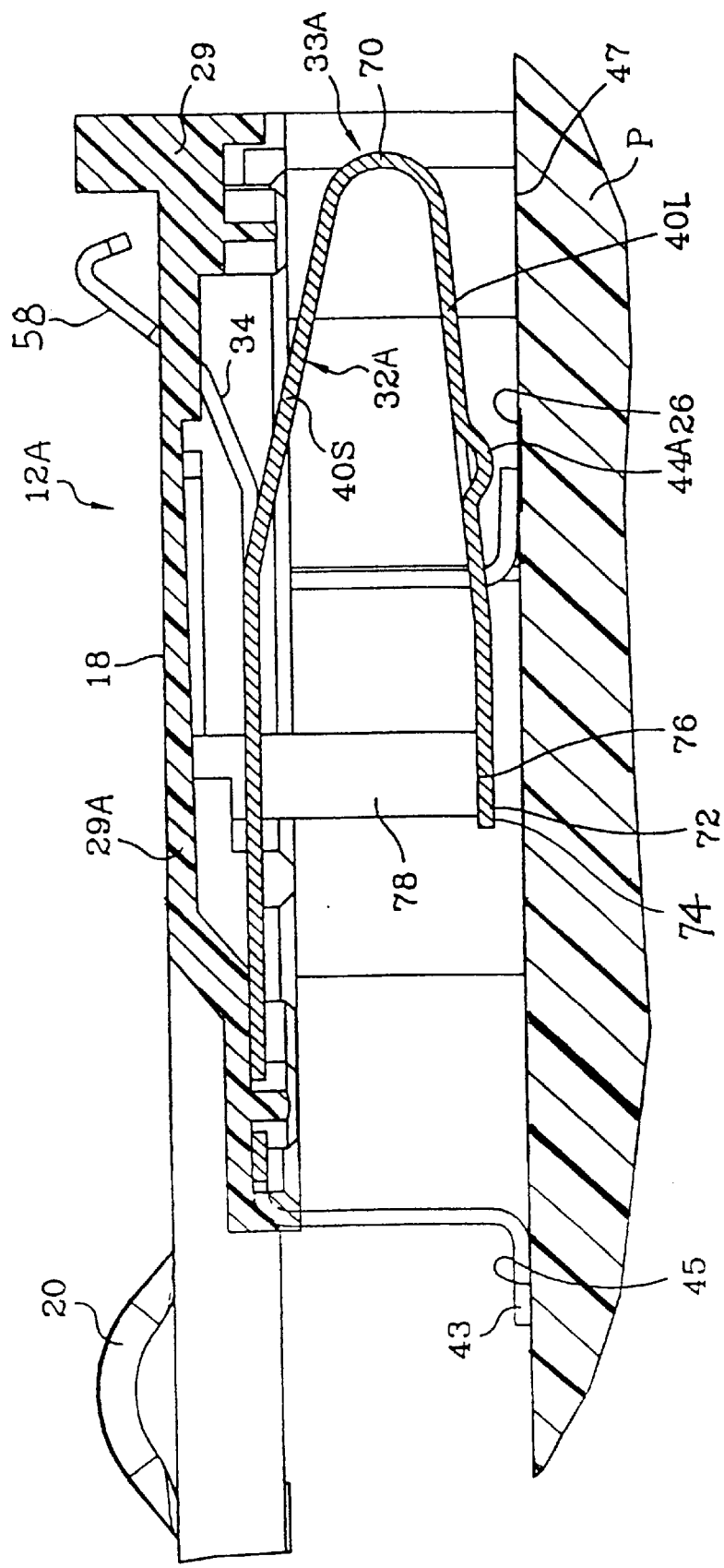
Figure 14:
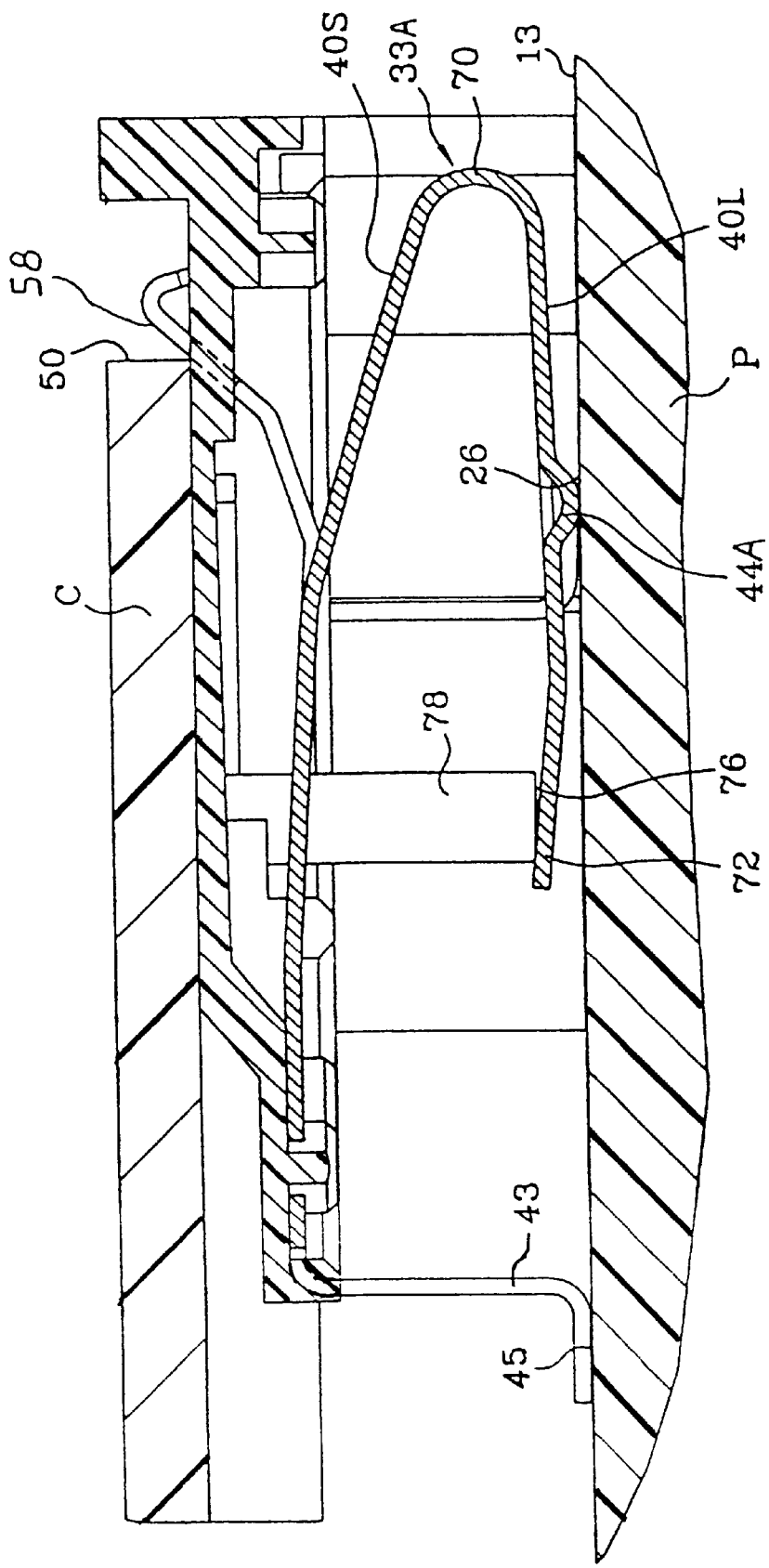
Figure 15:
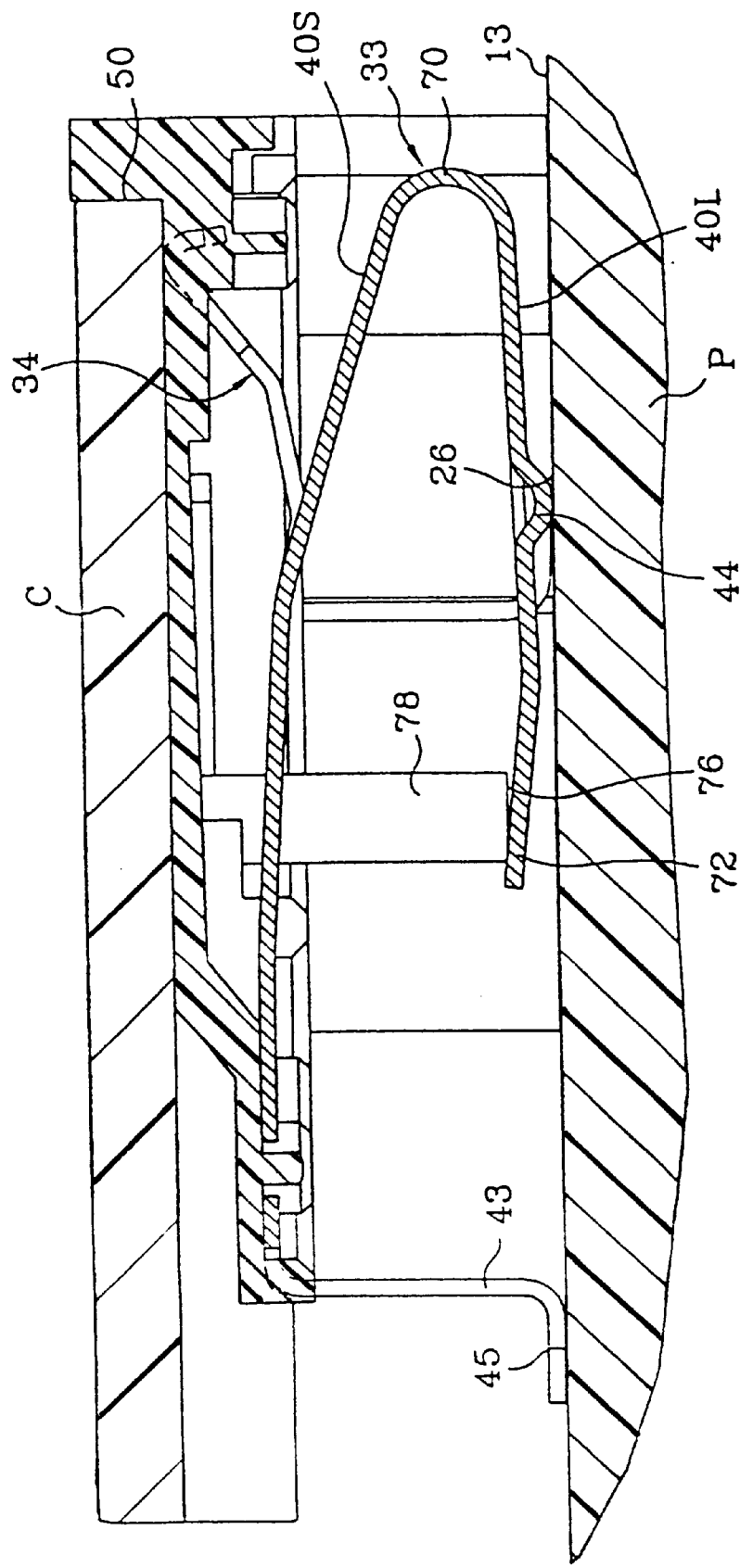
Figure 16:
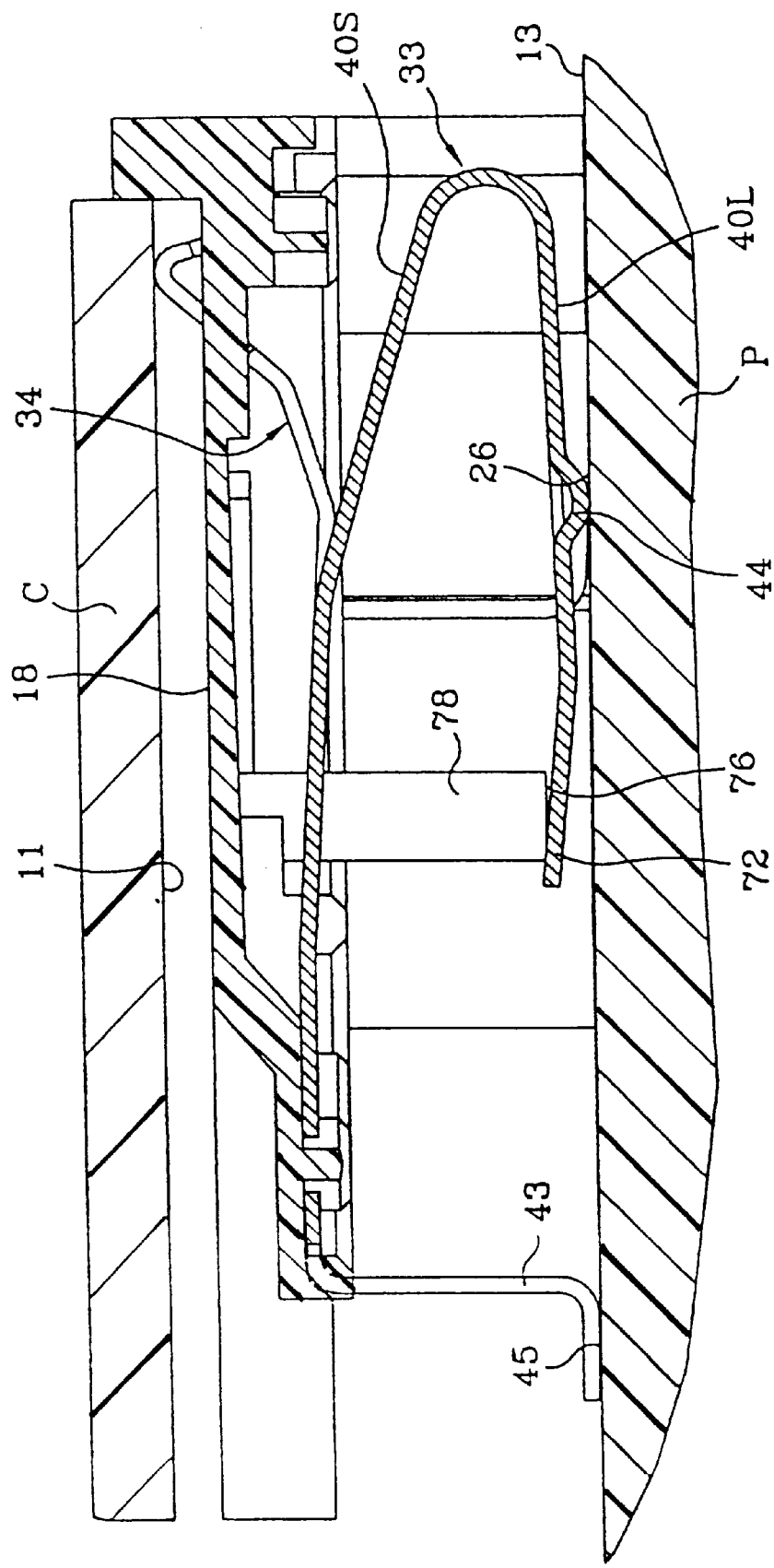

FIG. 13 shows the switch element 33A mounted on the support 29A, with the contacting part 44A lying over the second switch terminal 26. The tabs 72 on the bearing bar 74 press up against height-control, or positioning wall 76 at the lower end of column 78 of the support. This fixes the height of the bearing bar 74, to thereby fix the height of the contacting part 44A. FIG. 14 shows a card C depressing the pedal 58, resulting in the contacting part 44A engaging the circuit board trace 26. FIGS. 15 and 16 show the card fully inserted and against the support top face, and show the card fully inserted but spaced above the support top face, respectively.

Figure 17:
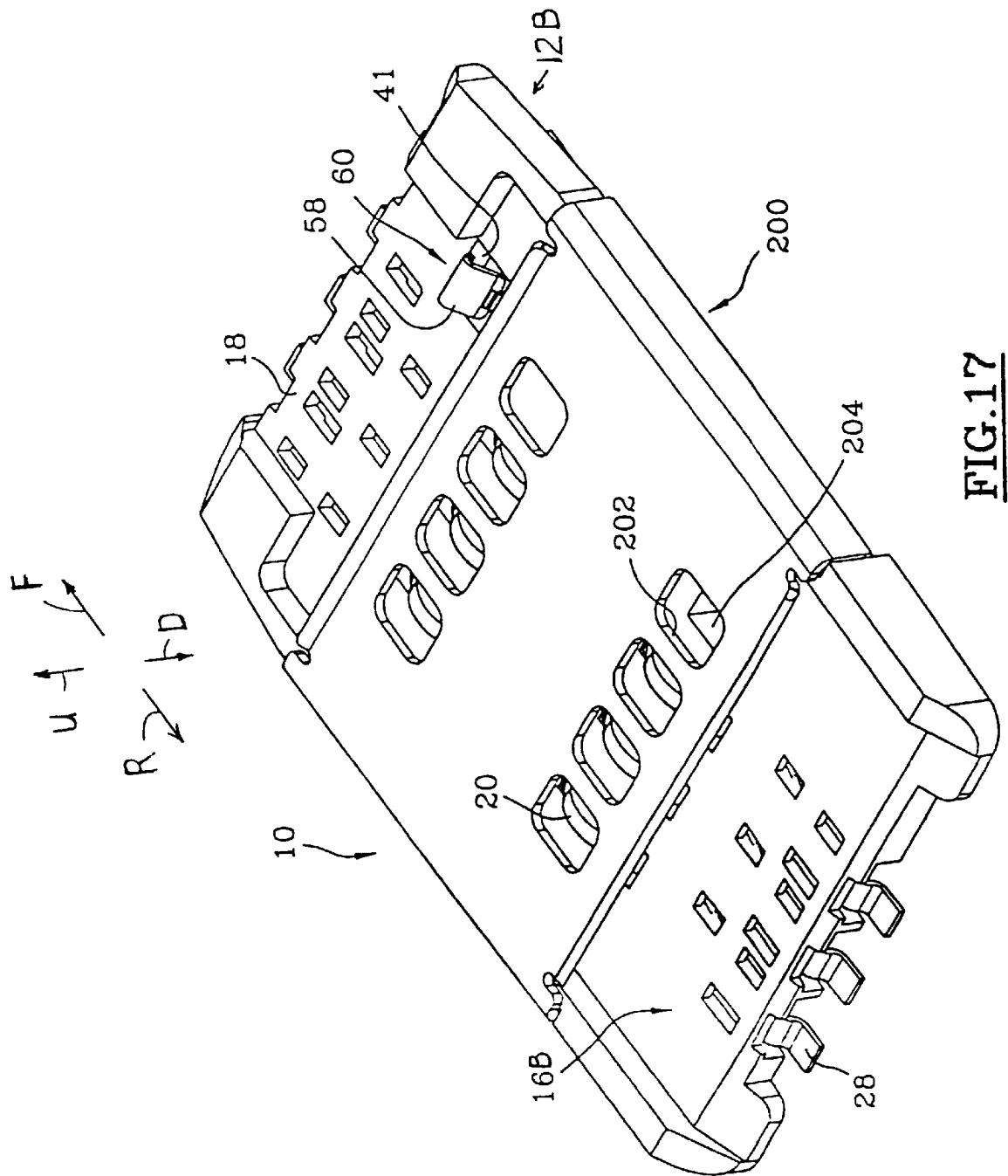
FIG. 17 is a top and rear isometric view of a connector with a switch assembly of another embodiment of the invention.
Figure 18:
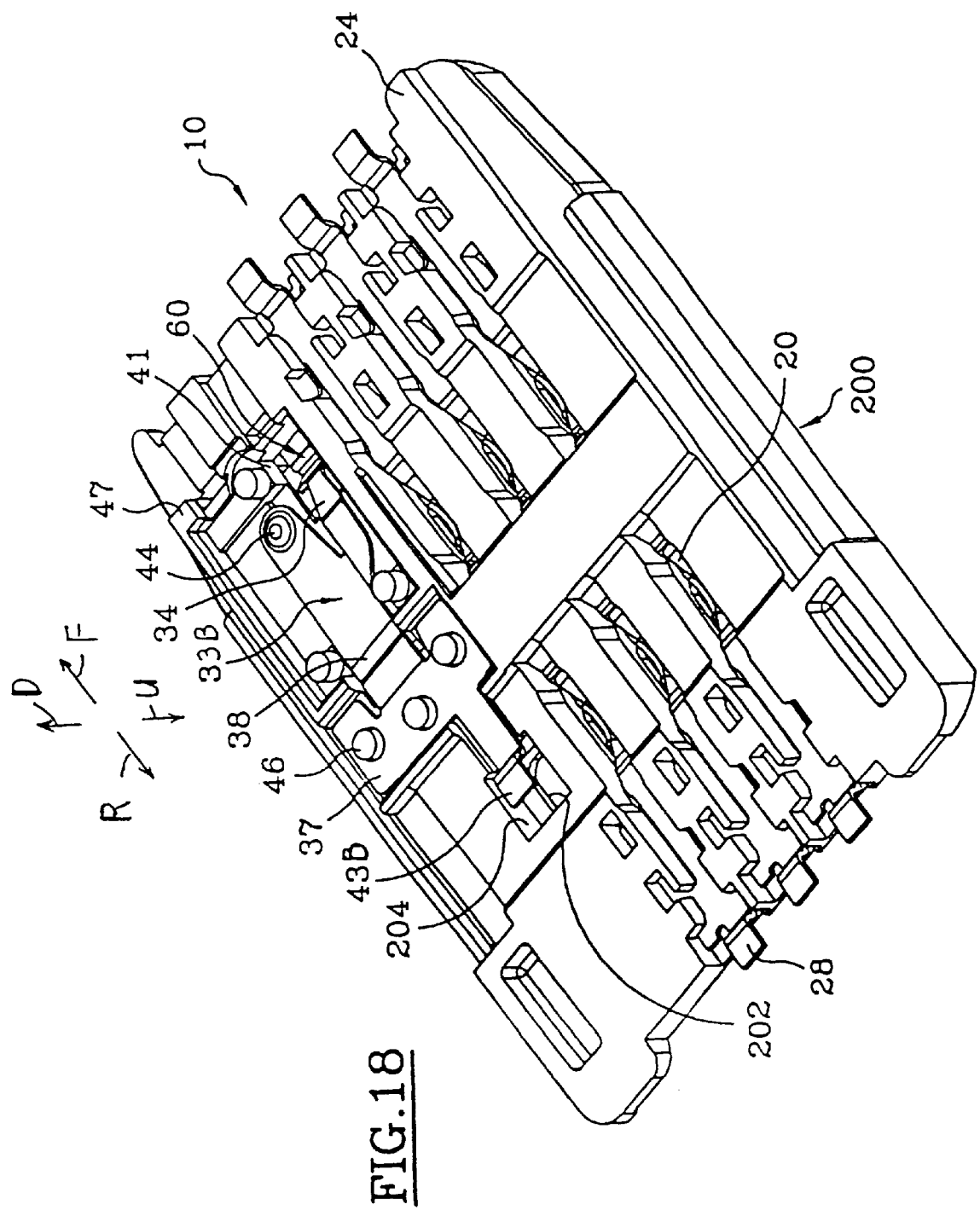
FIG. 18 is an upside-down view of the connector of FIG. 17.
Figure 19:
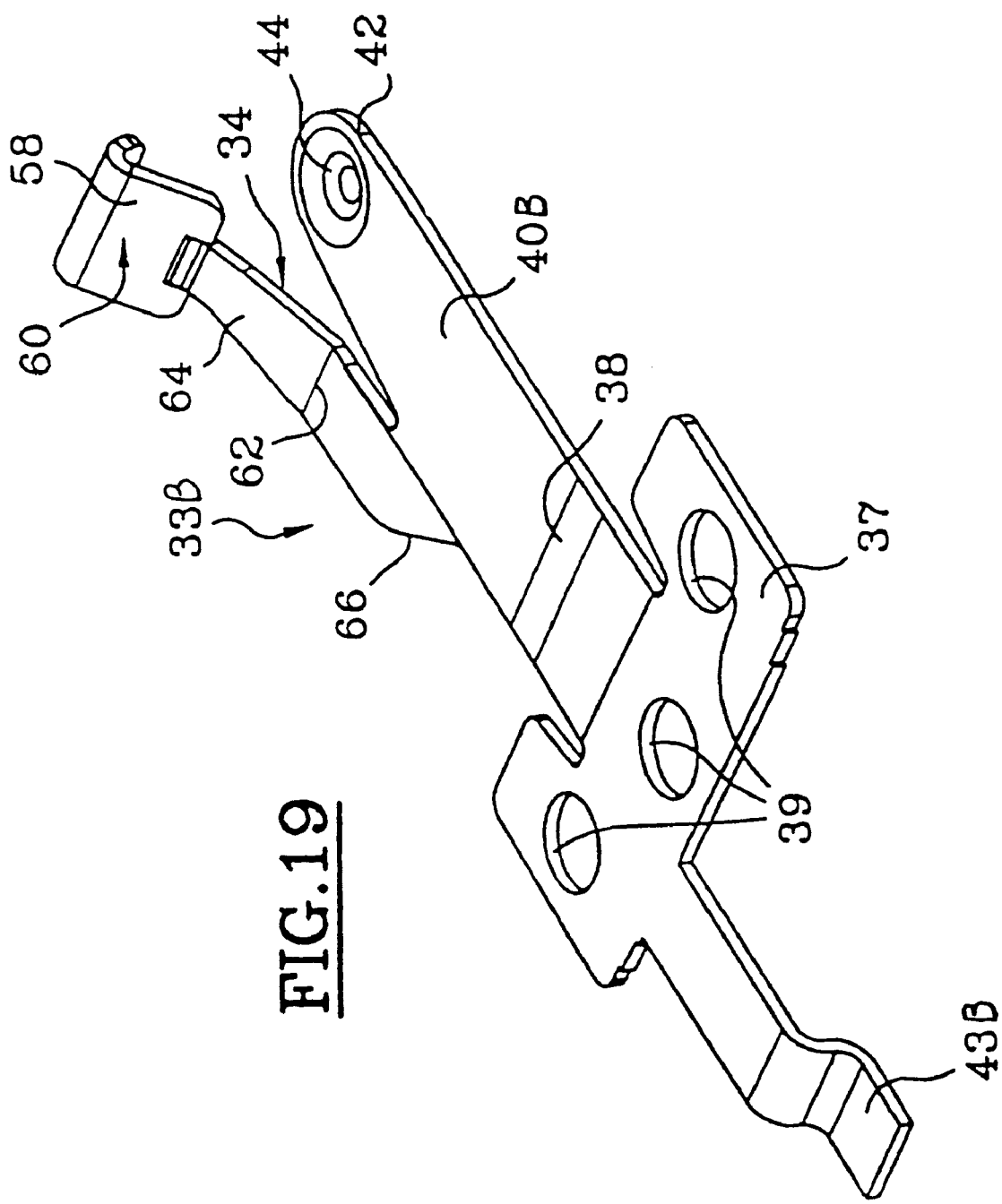
FIG. 19 is a top and rear isometric view of the switch element of the connector of FIGS. 17 and 18.

FIGS. 17–19 illustrate another connector with a switch assembly 12B similar to that of FIGS. 1–8. However, the switch element 33B shown in FIG. 19 has a control blade portion 40B of smaller length, and has a connection tab 43B of greater length but smaller width. The frame includes a metal cover 200 (FIG. 17) over a molded plastic frame 16B. The cover has a hole 202 in line with a hole 204 in the frame, to allow infrared-reflow soldering of the connection tab 43B. FIG. 18 shows the position of the tab 43B with respect to the hole 204. This design avoids the requirement for an excessively long connection tab, where the rear end of the support of the switch assembly merges with a further rearward extending portion of the connector frame.

Thus, the invention provides a switch assembly for mounting on a circuit board, where the switch assembly has a minimum of parts and can have a minimum height. The switch assembly includes a support or support part of insulative material for lying on the circuit board, and a sheet metal switch element. The switch element has a heel that is fixed to the support, a connecting tab for permanent connection to a circuit board trace, a pedal that projects above the top face of the support to be depressed by a card, and a contacting part that initially lies spaced above a second circuit board trace. When the pedal is depressed, it depresses the contacting part to cause it to directly engage the second circuit board trace and thereby close the switch. The switch element includes a deflectable portion with a blade portion that extends forwardly from the heel and that holds the contacting part at its front end, the blade portion extending in substantially a horizontal plane. A lever that includes the pedal at its front end, extends from a middle part of the blade portion, with the pedal extending at an upward-forward incline to project above the top face of the support. The heel is held by a plurality of studs that project down through holes in the heel and that have lower ends that are upset. Although a switch of small thickness is usually required, a switch of greater thickness can be provided, with only a single integral switch element and the molded support, by forming a hairpin bend in the blade portion, so that a lower section of the blade portion holds the contacting part and lies below the upper section of the blade portion.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A switch assembly for mounting on a circuit board that has first and second switch traces thereon, and for detecting full insertion of a smart card, comprising:

a support of insulative material for lying on said circuit board, said support having an upper face for lying facewise close to the card;

a switch element of electrically conductive material, said switch element having a heel that is fixed to said support, a connect tab extending from said heel, and a deflectable portion extending in a forward direction from said heel, said deflectable portion having a pedal projecting above said support upper face to be depressed by said card, and said deflectable portion having a contacting part positioned to be depressed when said pedal is depressed;

said connect tab is positioned to contact said first switch trace and said contacting part of said deflectable portion Is positioned to lie over said second switch trace when said support lies on said circuit board, with said contacting part spaced a distance above said second switch trace to move down and directly engage said trace when said pedal is depressed to a position even with said support upper face but not when said pedal is not depressed.

2. The switch assembly described in claim 1 including said circuit board, wherein:

said connect tab is soldered to said first switch trace while said contacting part lies over said second switch trace.

3. The switch assembly described in claim 1 wherein:

said deflectable portion of said switch element includes a blade portion and a lever, with said pedal lying at a front end of said lever, said blade portion merging with said lever and extending primarily forward therefrom, and with said contacting part lying at a front end of said blade portion, with said lever being integral with said blade portion;

said heel and said blade portion both lie substantially in a horizontal plane that is parallel to said circuit board.

4. The switch assembly described in claim 1 wherein:

said support has a top wall forming said upper face and forming a downwardly-opening cavity, and said support forms a plurality of studs extending down from said top wall into said cavity, said top wall and said studs being integrally molded;

said heel has a plurality of holes, and said studs project through said holes.

5. The switch assembly described in claim 4 wherein:

said studs have upset lower ends that lie at the bottom of said support to lie on said circuit board.

6. The switch assembly described in claim 1 wherein:

said deflectable portion of said switch element includes upper and lower branches with front ends connected at a bend, with said upper and lower branches each extending largely rearwardly from said bend, with said contacting part lying on said lower branch.

7. The switch assembly described in claim 6 wherein:

said support has a positioning wall, and said lower branch has a rear end biased up against said positioning wall.

8. The switch assembly described in claim 1 wherein:

said support has a height-control wall;

said switch element has a blade portion which forms said contacting part, with said blade portion having a part biased upwardly against said height control wall.

9. A switch assembly for detecting full insertion of a card comprising:

a circuit board having a board face with first and second switch traces thereon;

a support of insulative material having a lower face lying substantially on said board face and having a top face for substantially supporting the card;

a switch element of electrically conductive material having a tab connected to said first switch trace, a heel fixed to said support, a lever forming a pedal lying above said support top face to be depressed by a card, and a blade coupled to said lever to be downwardly deflected when said pedal is depressed, said blade having a contacting part lying over said second switch trace to directly engage said second switch trace and thereby connect said first and second switch traces through said tab and said contacting part when a card depresses said pedal.

10. The switch assembly described in claim 9 wherein:

said support has front and rear ends, with said pedal lying at said front end, said switch element first portion is a heel that lies at a rear end of said support, and said tab extends from said heel and lies at said rear end of said support.

11. The switch assembly described in claim 9 wherein:

said support extends further rearward than said tab, but said support has a vertical through hole lying over said tab, to enable the application of heat through said hole to solder said tab to said first switch trace.

12. The switch assembly described in claim 9 wherein:

said switch element is formed of sheet metal and said lever and blade merge into each other and each extends substantially parallel to said board face.

13. The switch assembly described in claim 9 wherein:

said support top face has an opening with a rear end and said pedal projects at an incline through said opening and is biased against said opening rear end when not depressed;

said heel and said blade of said switch element merge and both lie substantially parallel to said board face when said pedal is not depressed.

14. The switch assembly described in claim 9 wherein:

said switch element first portion is a heel lying at a rear end of said switch element, and said third portion has a rear end that merges with said heel and that is narrower than said heel, and said heel has a pair of slots at opposite sides of said third portion rear end for increasing the effective length of said rear end.

* * * * *